United States Patent [19]

Kim

[11] Patent Number: 5,042,065

[45] Date of Patent: Aug. 20, 1991

[54] RESETTING CIRCUIT IN A KEY-TELEPHONE SYSTEM

[75] Inventor: Sung-Taek Kim, Kumi, Rep. of Korea

[73] Assignee: SamSung Electronics Co., Ltd., Kyung Ki-Do, Rep. of Korea

[21] Appl. No.: 387,592

[22] Filed: Jul. 31, 1989

[30] Foreign Application Priority Data

Jul. 30, 1988 [KR] Rep. of Korea ............... 1988-12522

[51] Int. Cl.$^5$ .................................... H04M 1/00
[52] U.S. Cl. .................................... 379/165; 379/412; 379/413
[58] Field of Search ............... 379/32, 156, 165, 413, 379/412

[56] References Cited

U.S. PATENT DOCUMENTS 4,887,293 12/1989 Molnar .......................... 379/165

FOREIGN PATENT DOCUMENTS

| | | | |
|---|---|---|---|
| 58-99091 | 6/1983 | Japan | 379/165 |
| 0196096 | 10/1985 | Japan | 379/165 |
| 0200852 | 9/1987 | Japan | 379/165 |
| 1-151347 | 6/1989 | Japan | 379/165 |

*Primary Examiner*—Jin F. Ng
*Assistant Examiner*—Jhancy Augustus
*Attorney, Agent, or Firm*—Robert E. Bushnell

[57] ABSTRACT

There is disclosed a resetting circuit of a key telephone system (KTS) capable of preventing data error caused by unstable power supply and instantaneous power-off of a key system unit (KSU), by adjusting a DC voltage of the key telehpone system, said DC voltage is applied to a reset terminal of a microprocessor in the key telephone system. The invention includes a power supply for supplying power to the KSU and KTS, a microprocessor for controlling the overall operation of the KTS, a first detecting means for detecting the voltage change of a first voltage Vcc1, and a second detecting means for detecting the voltage change of a second voltage Vcc2.

12 Claims, 3 Drawing Sheets

RESETTING CIRCUIT IN A KEY-TELEPHONE SYSTEM

BACKGROUND OF THE INVENTION

The present invention relates to a resetting circuit of a key telephone subset (hereinafter referred to as KTS) in a key-phone system and, more particularly, to a resetting circuit capable of preventing data error and power-down phenomenon caused by unstable AC power supply which is provided from a key system unit (hereinafter referred to as KSU).

Generally, a key-phone system includes a power supply for the KSU to supply the KTS with +24V through sixteen extension lines, when the sixteen extension lines are connected to eight office lines. Further, the KTS adjusts the power supplied from the KSU to an adequate power which is suitable to operate the KTS and internal circuit thereof. Therefore, the KTS includes self power supply for the purpose of supplying stable power.

Referring now to FIG. 1 illustrating a conventional resetting circuit, there is KSU 100 connected to a portion 200 of the KTS. A power supply 10 of the KSU 100 supplies the KTS with +24V through a power port P1 and P2. Said power +24V is applied to capacitors C1 and C2, and a first and second switching power circuits 11 and 12 to generate a first voltage Vcc1 (+12V) and a second voltage Vcc2 (+5V). Then, said Vcc1 and Vcc2 generated by the first and second switching power circuits 11 and 12 are applied to a microprocessor 20 of the KTS 200, wherein Vcc1 is applied to the microprocessor 20 via a data link 30 of the KTS and Vcc2, delayed by a time constant which is determined by resistor R11 and capacitor C11, is then applied to a reset terminal $\overline{RST}$ of the microprocessor 20, causing microprocessor to be reset. If the AC power of the power supply 10 is off instantaneously during the operation, then the Vcc1 falls in abnormal state while the Vcc2 keeps in a normal state, of course, it depends on the power-off timing and power load of the power supply 10.

Accordingly, though the microprocessor 20 keeps working, the Vcc1 which is applied to the data link 30 is downed to 2 or 3 voltages. Hence, data logic is changed, by which the microprocessor may read and send error data. Therefore, it is a drawback of the prior key-phone system that the microprocessor 20 of the KTS is power-downed due to said reasons describe above. Further, a displaying means (not shown in FIG. 1) of the KTS 200 displays an error message thereon.

SUMMARY OF THE INVENTION

It is accordingly an object of the present invention to provide a resetting circuit of a key telephone system (KTS) capable of preventing data error caused by unstable power supply and instantaneous power-off of a key system unit (KSU), by adjusting a DC voltage of the key telephone system, said DC voltage is applied to a reset terminal of a microprocessor in the key telephone system.

According to one aspect of the invention, the resetting circuit generates a reset signal to reset a microprocessor in case where a power supply of the KTS is not stable. Therefore the invention includes a power supply for supplying power to the KSU and KTS, a microprocessor for controlling the overall operation of the KTS, a first detecting means for detecting the voltage change of a first voltage Vcc1, and a second detecting means for detecting the voltage change of a second voltage Vcc2.

BRIEF DESCRIPTION OF THE DRAWINGS

These and other objects of the invention will be seen by reference to the description, taken in connection with the accompanying drawings, wherein.

DESCRIPTION OF THE PREFERRED EMBODIMENTS

These together with other objects and advantages which will become subsequently apparent reside in the details of construction and operation as more fully hereinafter described and claimed, reference being had to the accompanying drawings forming a part hereof.

Figure 1:
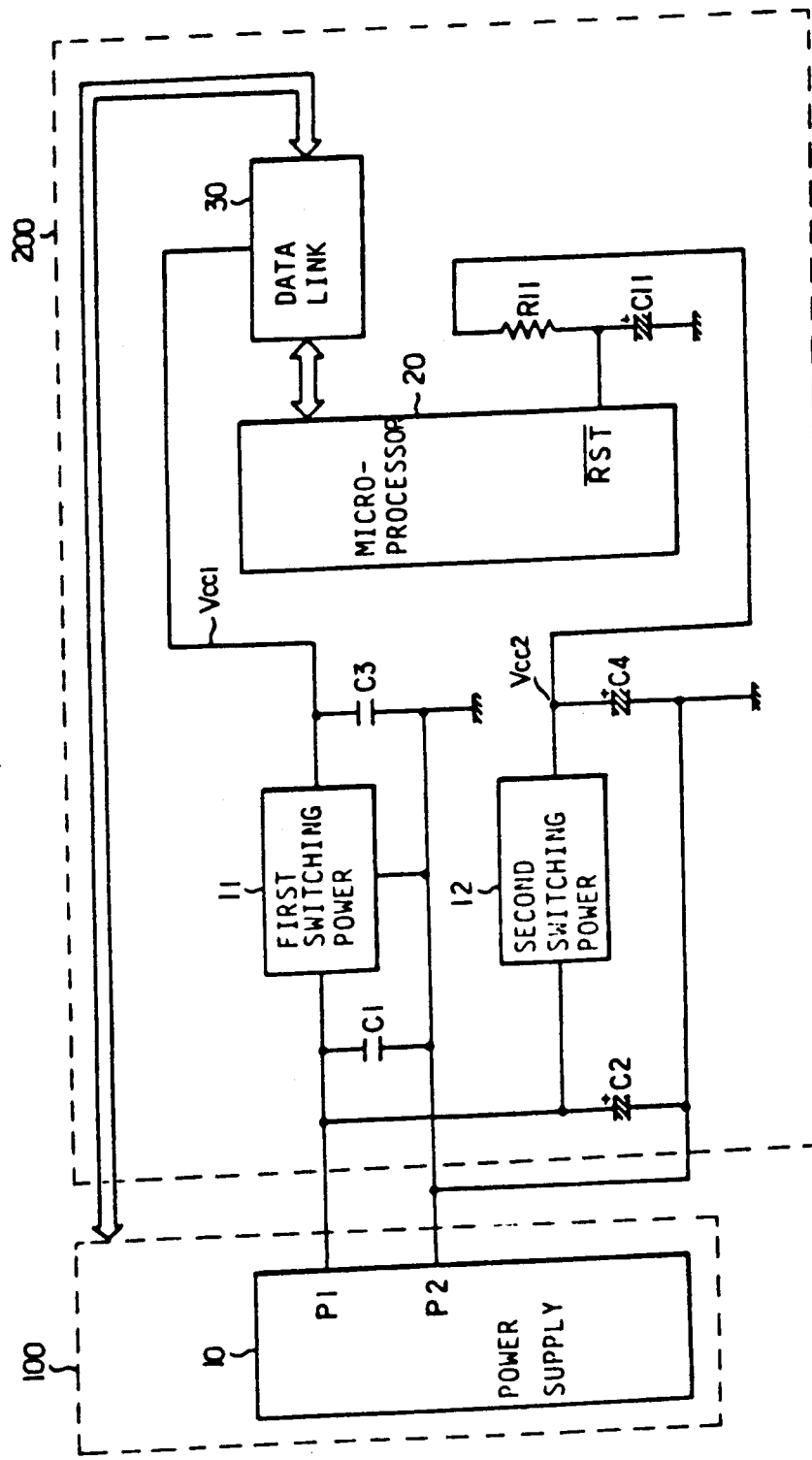
FIG. 1 illustrates a block diagram of a prior art.
Figure 2:
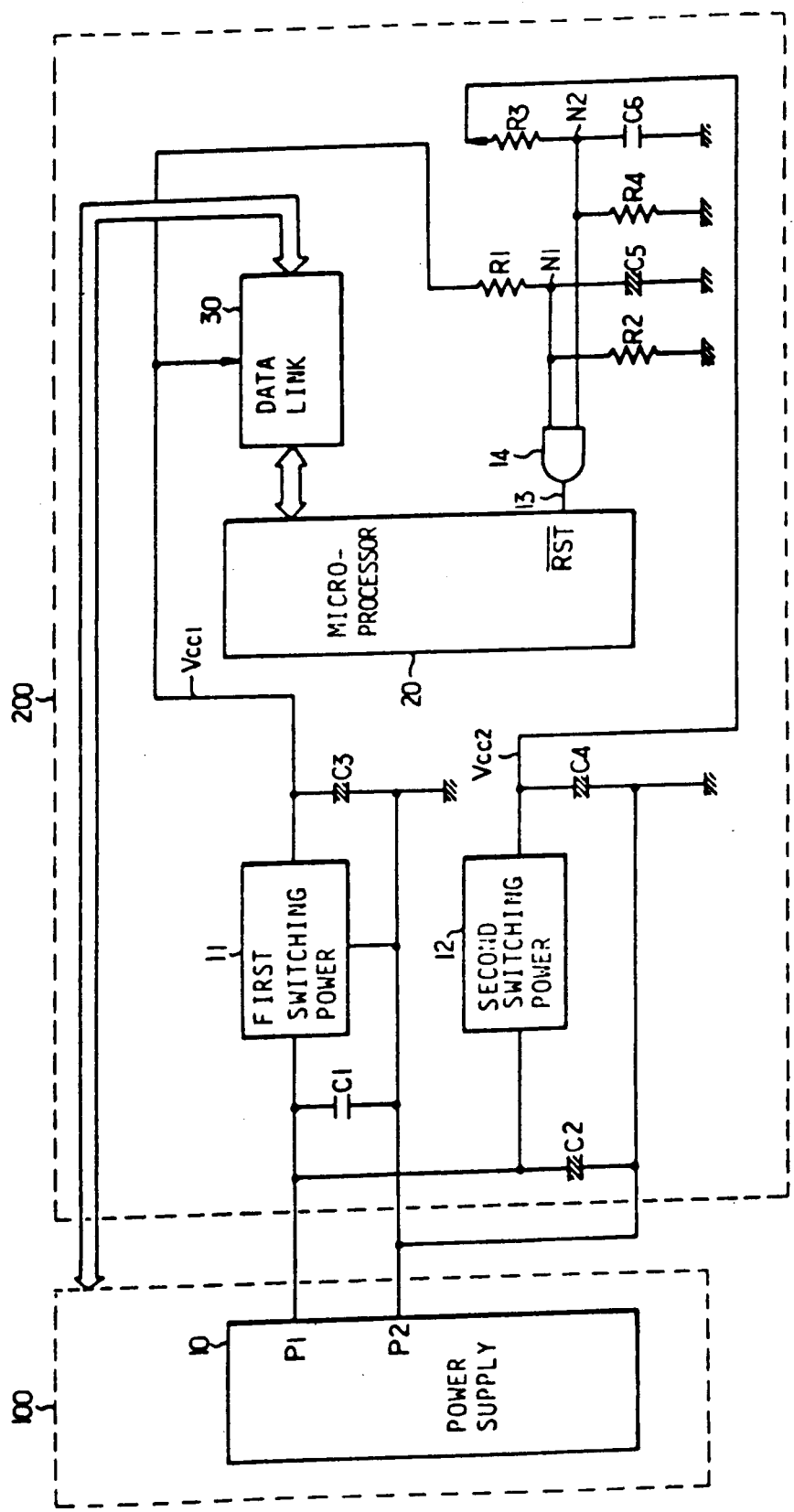
FIG. 2 illustrates a specific system block diagram for carrying out a preferred embodiment of the invention.

Referring row to FIG. 2, a reference numeral 10 designates a power supply for supplying the KSU 100 with the power. A voltage regulating means comprised of a plurality of capacitors C1 to C4 and first and second switching power circuits 11 and 12 providing a first and second voltage Vcc1 and Vcc2 by receiving power supplied from the power supply 10. Then, the microprocessor 20 indicates to a user that the data is received without the error, said microprocessor 20 operating with the first and second voltage received.

In addition, a data link 30 which is supplied the first voltage Vcc1 generated from said voltage regulating means links the data between the KSU 100 and the microprocessor 20. Thereafter, a first detecting means, comprised of a resistor R1 and R2 and a capacitor C5, detects the change of the first voltage Vcc1. In similar, a second detecting means, comprised of a resistor R3 and R4 and a capacitor C6, detects the change of the second voltage Vcc2 which is applied from said voltage regulating means. A reset signal generating means, comprised of an AND gate 14, generates a reset signal through a reset data line 13 to reset the microprocessor 20 after a logic operation of signals detected by the first and second detecting means. However, said power supply 10, the voltage regulating means, the microprocessor 20, and the data link 30 are identical to the prior art in their operation and configuration.

Figure 3:
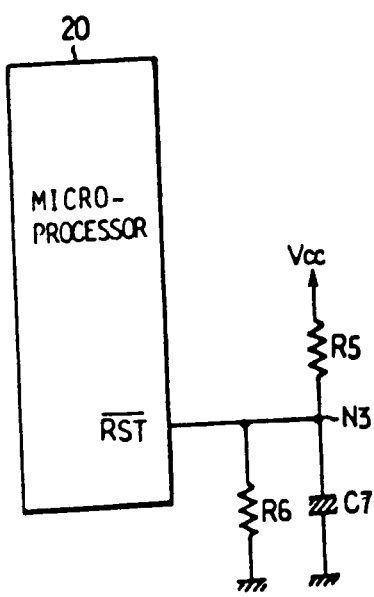
FIG. 3 illustrates a detailed portion of FIG. 2 according to another preferred embodiment of the invention.

Referring to FIG. 3, it is another preferred embodiment of the invention, in which only a portion of said another embodiment is shown. In this embodiment, a falling time of the first voltage Vcc1 is faster than that of the second voltage Vcc2.

The detailed description of the preferred embodiments will now be explained hereinafter in connection with FIG. 2 and FIG. 3.

If the falling time of the second voltage Vcc2 is sensitive to the change of the power supply, said voltage change is detected by the second detecting means. On the other hand, said first voltage Vcc1 is +12V as a data transmission voltage, and the second voltage Vcc2 is +5V as an operational power supplied to the KTS 200. The power supply 10 of the KSU 100 supplies the power to the KTS 200 through the power port P1 and P2 in order for the KTS 200 to operate and transmit the data.

Said power supplied from the power supply 10 is +24V which is applied to the voltage regulating means of the KTS 200. Furthermore, said power applied i changed to the first voltage Vcc1 and the second voltage Vcc2 by use of the voltage regulating means. Thereafter the first voltage Vcc1 is applied to the data link 30 so that said data link 30 can send and receive the data between the KSU 100 and the microprocessor 20 of the KTS 200. Besides, the first voltage Vcc1 is applied to a first input line of the AND gate 14 through a first node N1, with the time constant which is determined by the resistor R1 and the capacitor C5.

On the other hand, the second voltage Vcc2 is applied to a second input line of the AND gate 14 through a second a second node N2, with the time constant which is determined by the resistor R3 and capacitor C6. Then, the AND gate 14 outputs a logic high signal to the reset terminal $\overline{RST}$ of the microprocessor 20 if said first and second voltage Vcc1 and Vcc2 are inputted to the first and second input line of the AND gate 14, respectively, thereby said microprocessor 20 is not reset. Therefore, the microprocessor 20 operates normally. Thereafter, the voltage charged in the capacitor C5 and C6 is discharged through the resistor R2 and R4, respectively.

Now, if the voltage +24V supplied from the KSU 100 to the KTS 200 drops down instantaneously, then the first voltage Vcc1 is downed to about 2 or 3 voltages, which causes abnormal operation. Therefore, at the same time the first input line of the AND gate 14 receives logic low signal, so that the AND gate 14 outputs logic low signal to the reset terminal $\overline{RST}$ of the microprocessor 20. Then the microprocessor 20 is reset. Accordingly said microprocessor 20 can operate normally only when the supplied power is stable.

Therefore, the key-phone system prevents data error due to reading and sending the error data. Moreover, said second voltage Vcc2 is divided by the resistor R3 and R4 and then applied to the first input line of the AND gate as a reference voltage, said reference voltage may be established according to the characteristics of the key-phone system.

FIG. 3 is the another preferred embodiment of the portion of FIG. 2. In this case, the first voltage Vcc1 has faster falling time than that of the second voltage Vcc2, in which the KSU 100, the voltage regulating means, the microprocessor 20, and the data link 30 are same with those of FIG. 2 in their configurations and operation. In this another embodiment the reset signal generating means herein monitors only the first voltage Vcc1. If the voltage +24V supplied from the KSU 100 to KTS 200 drops down, the first voltage Vcc1 of the KTS 200 is downed to about 2 or 3 voltages. Then, the voltage dropped down is divided by a resistor R5 and R6, charging a capacitor C7 simultaneously. A node N3 then has a voltage below 0.8 V. Said voltage of the node N3 is applied to the reset terminal $\overline{RST}$ of the microprocessor 20, and thereby the microprocessor is reset. Therefore, the key-phone system can prevent the data error.

As described above, the invention has an advantage of preventing the data error caused by the unstable power supply or by the instantaneous power-off of the KSU, by monitoring the first and second voltage Vcc1 and Vcc2 simultaneously, so that the reliability of the products can be highly improved.

It is further understood by those skilled in the art that the foregoing description is in a preferred embodiment of the disclosed device and that various changes and modifications may be made in the invention without departing from the spirit and scope thereof.

What is claimed is:

1. A resetting circuit in a key-phone system including a power supply in a key system unit, a voltage regulating means supplying a first and second voltage to a microprocessor, and a data link receiving said first voltage, said circuit comprising:
   a reset signal generator for detecting a voltage state of the first voltage and a voltage state of the second voltage which is produced from the voltage regulating means, and
   generating a reset signal in order to reset the microprocessor if the first voltage's detected state is unstable.

2. The resetting circuit as set forth in claim 1, wherein said reset signal generator comprises:
   a first detecting means for detecting a state of the first voltage which is produced from the voltage regulating means;
   a second detecting means for detecting a state of the second voltage which is produced from the voltage regulator means; and
   a gate for generating the reset signal by receiving the voltages detected by said first and second detecting means.

3. The resetting circuit as set forth in claim 2, wherein said gate is an AND gate whose output is connected to a reset terminal of the microprocessor.

4. A resetting circuit in a key-phone system including a power supply in a key system unit, voltage regulating means for supplying a first and second voltage to a microprocessor, and a data link receiving said first voltage, said circuit comprising:
   first means for receiving said first voltage and outputting a delayed first voltage;
   second means for receiving said second voltage and outputting a delayed second voltage as a reference voltage; and
   gate means for receiving said delayed first voltage and said reference voltage and for outputting reset signal to said microprocessor.

5. The resetting circuit as set forth in claim 4, wherein said first means comprises a first resistor and a first capacitor, and said second means comprises a second resistor and a second capacitor.

6. The resetting circuit as set forth in claim 4, wherein said gate means comprises an AND gate.

7. The resetting circuit as set forth in claim 5, wherein said gate means comprises an AND gate.

8. The resetting circuit as set forth in claim 5, wherein said gate means comprises an AND gate having a first input connected to a node between said first resistor and said first capacitor and a second input connected to a node between said second resistor and said second capacitor.

9. The resetting circuit as set forth in claim 8, further comprising a third resistor connected in parallel to said first capacitor, and a fourth resistor connected in parallel to said second capacitor.

10. A resetting circuit in a key-phone system including a power supply in a key system unit, voltage regulating means for supplying a first and second voltage to a microprocessor, and a data link receiving said first voltage, said circuit comprising:
    a reset generator for comparing the voltage state of the first voltage to the voltage state of the second voltage and for generating a reset signal in order to reset said microprocessor whenever the voltage state of said first voltage falls to a level lower that the level of the voltage state of said second voltage.

11. The resetting circuit as set forth in claim 10, wherein said reset signal generator comprises:
first delay means for responding to said first voltage, second delay means for responding to said second voltage, and gate means for receiving the outputs of said first and second delay means and providing said reset signal.

12. The resetting circuit as set forth in claim 10, wherein said gate means comprises an AND gate.

* * * * *

UNITED STATES PATENT AND TRADEMARK OFFICE
CERTIFICATE OF CORRECTION

PATENT NO. : 5,042,065

DATED : August 20, 1991

INVENTOR(S) : Sung-Taek KIM

It is certified that error appears in the above-identified patent and that said Letters Patent is hereby corrected as shown below:

Column 1, Line 27, delete "a";

Column 2, Line 2, change "row" to --now--;

Signed and Sealed this

Fifth Day of January, 1993

Attest:

DOUGLAS B. COMER

Attesting Officer

Acting Commissioner of Patents and Trademarks